Figure 1:
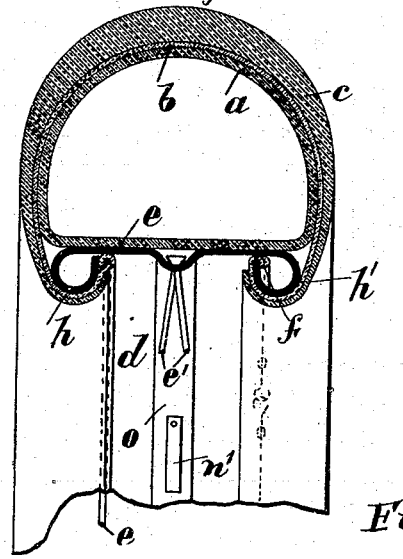

(No Model.)

T. D. GLEN, W. PURVIS & S. SMITH.
PNEUMATIC TIRE.

No. 503,660.   Patented Aug. 22, 1893.

Witnesses:
M. C. Pinckney
M. A. Butters

Inventors
Sydney Smith,
Thomas Dunn Glen,
William Purvis
by Bowen & Behrens
attys.

UNITED STATES PATENT OFFICE.

THOMAS DUNN GLEN, WILLIAM PURVIS, AND SYDNEY SMITH, OF GLASGOW, SCOTLAND.

PNEUMATIC TIRE.

SPECIFICATION forming part of Letters Patent No. 503,660, dated August 22, 1893.

Application filed April 6, 1893. Serial No. 469,330. (No model.) Patented in England November 14, 1892, No. 20,459.

*To all whom it may concern:*

Be it known that we, THOMAS DUNN GLEN, cycle agent, 52 Park Road, WILLIAM PURVIS, cycle-maker, of 186 Henderson Street, and SYDNEY SMITH, cycle-maker, of 101 South Woodside Road, Glasgow, Scotland, subjects of the Queen of Great Britain, have invented certain new and useful Improvements in and Relating to Pneumatic Tires and the Method of Fastening the Same to the Rims of Wheels, (for which we have received a patent in Great Britain, No. 20,459, dated November 14, 1892,) of which the following is a specification.

This invention relates to pneumatic tires and the method of securing the same to the rims of wheels. The wheel rim we prefer to use is made in cross section either flat or convex and with a turned over edge beading at either side. The pneumatic tire consists of an ordinary rubber tube inflated with air, over which a canvas covering is secured. The canvas covering is preferably covered with india-rubber so as to form the tread of the tire. One edge of the rubber cover with its canvas lining is secured to one side of the rim by lacing, belting, wiring, or the like, so as to be fixed rigidly to the rim. Or this side may be secured to the interior surface of the rim by a ribbon of steel or by a wire, cord, chain or the like. The opposite edge of the cover or tread has a wire, chain or cord inserted either in a fold or lap of the canvas or in the rubber itself. This wire may extend right round the rim of the wheel, and the ends may be connected at any suitable part by means of a screw nipple or a simple nipple or by twisting the ends of the wires together.

The method of securing the tire to the rim is as follows:—The interior rubber tube, which may or may not be covered with canvas, is first sprung on to the rim of the wheel and then one edge of the cover is firmly secured, in the manner hereinbefore explained, to the inner surface of the rim. The cover, with the wire in its other edge, is then laid right over the top of the tube and is secured in position by springing the wire ring over the beading. The cover is now held securely in place, being attached by the fastening at one side, and the wire at the other side, to the inside of the rim. The cover cannot now come off as the beadings hold it firmly in place and prevent any possibility of the tire shifting from its position.

If it is desired at any time, in the case of puncture or the like, to gain access to the inner tube so as to repair it, all that is necessary is to insert a small lever or bar between the wire and the beading, so as to spring the wire out of its position and thereby release one side of the cover, so that it can be bent right over and the inner tube exposed to view. Repairs can, with this tire, be easily effected in two or three minutes.

Our invention has the following merits among others:—first, that the fastenings are at the inside of the rim, and therefore they are not liable to be cut or abraded, nor is mud or moisture liable to gain access to them; second, that as the rim is flat or slightly convex, the inner tube has an even surface or seat to rest on; third, that the construction of rim and method of securing the cover or tread, afford every facility for lateral expansion when running; fourth, that the tire can be fitted onto the rim in a few minutes; fifth, that the tire can be taken off the rim in a few minutes; sixth, that one side of the cover can be easily taken off, so as to afford easy access to the interior tube; seventh, that when the tire is once secured in position, it cannot displace itself; eighth, that there is little or no possibility of the rim cutting the inner tube or cover.

We are aware that wires have been used for securing the covers of tires to the outside of the rim, and it is to be understood that we never depart from our method of securing the covers to the inside of the rim.

We in all cases, have one side of the cover permanently secured to the rim, while the other side is removable for the purpose of repairing, at any time.

In order that our said invention may be properly understood, we have hereunto appended an explanatory sheet of drawings, whereon—

Figure 2:
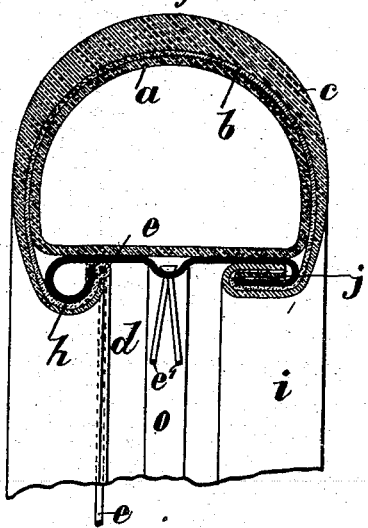
Figure 5:
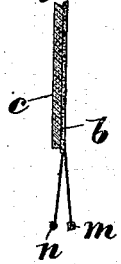
Figure 3:
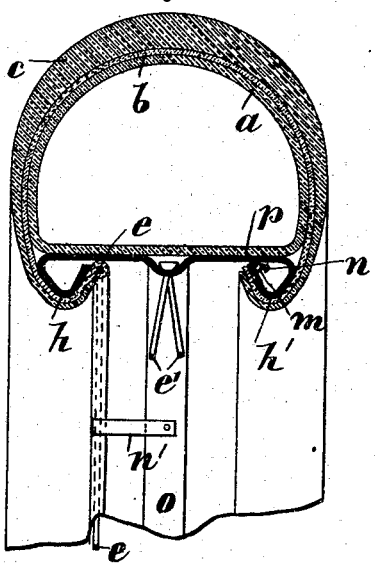
Figure 4:
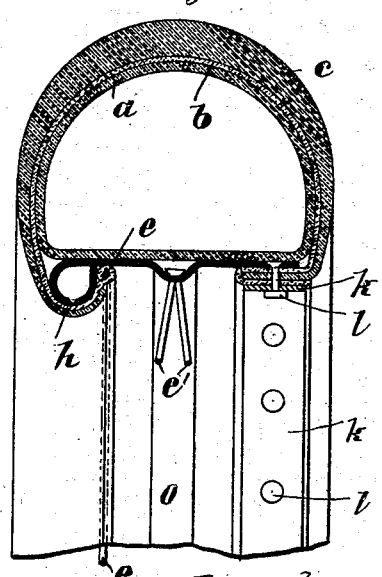

Figure 1 is a section of our tire and rim and showing one method of fastening. Fig. 2 shows a different method of fastening the tire to the rim. Fig. 3 shows a third method of fastening the tire to the rim. Fig. 4 shows a fourth method of fastening the tire to the rim. Fig. 5 is a detail sectional view.

Referring to the drawings whereon the same reference letters wherever repeated indicate similar or like parts, $a$ is the usual rubber tube which is inflated with air.

$b$ is the usual canvas covering for the tube $a$.

$c$ is the usual rubber tread.

$d$ is the rim which is made with two beaded edges $h, h'$.

$e'$ are spokes.

As will be seen the rim $d$ is formed on the inner circumference with two bent over edges or beadings $h, h'$ into one of which, in Fig. 1, one side of the covering $b, c$, is inserted. A chain $f$, or a cord or equivalent may be in inserted in a lap or fold of the canvas $b$ and be extended right around the tire. The ends of the chain $f$ may be passed through the beading and the canvas and be hooked together as shown at $g$, Fig. 1. By passing the chain through the beading the tire is prevented from creeping, i. e. from shifting round the rim. The beading $h'$ holds the right hand side of the cover $b, c$, firmly in place and so that it cannot be easily moved.

At the opposite side of the cover $b, c$, a wire, cord, or chain $e$, or equivalent is passed through a lap or fold in the canvas. This wire extends right round the tire and its ends may be joined by a nipple or otherwise.

The rim is or may be made with a central channel $o$ which extends right round it and which is for the reception of the heads of the spokes. By using a channel the inner tube $a$, when inflated, can lie perfectly flat on the rim and it is not liable to be abraded or torn by the spokes.

In fitting the tire to the rim, the side of the cover, at $f$, is first inserted into the inside of the beading $h'$ and the chain or equivalent stretched taut, and secured. Then the inner tube $a$ is fitted on the rim and the cover brought down over it. The wired side $e$ of the cover is now sprung into place over the beading $h$. The cover is now firmly held in place and the inner tube can be inflated, when the tire will assume the appearance shown at Fig. 1. The left or wired side of the cover can be easily taken off for repairing the inner tube. If preferred the inner tube $a$ may be first sprung on the rim and then the cover secured in place.

In Fig. 2 a different method of securing the right hand side of the tire is shown. In this figure a strip of steel or other metal $j$ is inserted in a fold of the canvas $b$ and the right hand side $i$ of the periphery of the rim, instead of being beaded over as shown at Fig. 1, is bent over so as to firmly grip and hold the plate and canvas in place. This method of holding the one side of the cover in place is a very secure one.

In Fig. 3 the rim is shown with triangular shaped beadings $h, h'$ and the cover is secured firmly at one side by means of two canvas flaps $m, n$ (see Fig. 5) in a fold in the ends of which wire or other cores are fitted. The two flaps, which are continuous right round the cover, are inserted one at a time in the inside of the beading $h'$. When the tire is inflated the flaps cannot come out through the narrow opening $p$ left between the beading and the rim which is only large enough to allow for the passage of a single flap at a time, as they are pulled close together so as to form a thick double ridge or rib too large for the opening. If it is desired, however, to take them out at any time the tire is deflated and the flaps are pulled out one at a time.

In Fig. 4 one side of the cover is held in place by means of a band or ribbon of steel or other metal $k$ which is riveted or secured to the rim $d$ by rivets or screws $l$. The ribbon $k$ presses on the cover $b, c$, and holds it firmly and securely in place.

In all cases with our invention one side of the cover is fixed firmly in position on the inside of the rim and the other is removable so as to be taken off for repairs, &c. A thin strip of metal $n'$ or a wire or equivalent is or may be pinned to the rim. When securing the wired side $e$ of the cover in place the strip $n'$ is turned round so as to grip and hold it in place at one part while the other parts are being forced into position. Figs. 1 and 3 show the strip in the two positions. The fixed side of the cover may be secured to the rim by lacing, or wiring if so desired.

If desired the wires, chains, &c., may be embedded in the rubber cover, instead of folded in the canvas.

Having now fully described our invention, what we claim, and desire to secure by Letters Patent, is—

1. In a tire, the combination with the rim having beadings $h, h'$, of the rubber tube $a$ capable of being inflated, a canvas covering $b$ for the tube extending between said beadings around said tube, and the rubber tread $c$, one edge of such canvas covering confined between one of the beadings and one of the edges of the rubber tread, its other edge formed in a lap or fold, and a wire cord or chain $e$ passing through such lap or fold, substantially as specified.

2. In a tire, the combination with the rim having beadings $h, h'$, of the rubber tube $a$ capable of being inflated, a canvas covering $b$ for the tube, and the rubber tread $c$, said canvas covering and said tread made to extend around the outer surfaces of said beadings, one of the edges of said canvas covering fixedly secured to one of said beadings and the other edge provided with a wire cord or chain, whereby such edge is reinforced and a shoulder is provided engaging with the edge of the rubber tread, substantially as set forth.

3. In a tire, the combination with the rim having beadings $h$, $h'$, of the rubber tube $a$, capable of being inflated, a canvas covering outside of such tube having one of its edges constructed in a loop or fold containing a wire cord or chain, and the rubber tread having one of its edges resting against the edge of the canvas so reinforced, substantially as set forth.

4. In a tire, the combination with the rim having beadings $h$, $h'$, of the rubber tube $a$, capable of being inflated, a canvas covering outside of such tube having one of its edges constructed in a loop or fold containing a wire cord or chain and adjustable strips as $n$ for confining the edge of the canvas so reinforced in position, substantially as set forth.

In witness whereof we have hereunto set our hands, at Glasgow, Scotland, this 15th day of March, 1893.

THOMAS DUNN GLEN.
WILLIAM PURVIS.

Witnesses:
WILLIAM FLEMING,
DUNCAN DEWAR.

In witness whereof I, the said SYDNEY SMITH, have hereunto set my hand, at London, England, this 17th day of March, 1893.

SYDNEY SMITH.

Witnesses:
GEO. BRODIE,
Of No. 72 *Bishopsgate Street, London, Solicitor.*
JOSEPH E. MOORES,
8 *Gt. Winchester Street, London, E. C., Clerk.*